(12) United States Patent
Bohn

(10) Patent No.: US 9,959,818 B2
(45) Date of Patent: May 1, 2018

(54) DISPLAY ENGINES FOR USE WITH OPTICAL WAVEGUIDES

(71) Applicant: MICROSOFT TECHNOLOGY LICENSING, LLC, Redmond, WA (US)

(72) Inventor: David D. Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

(21) Appl. No.: 15/273,249

(22) Filed: Sep. 22, 2016

(65) Prior Publication Data

US 2018/0082644 A1 Mar. 22, 2018

(51) Int. Cl.
*G09G 3/34* (2006.01)
*F21V 8/00* (2006.01)
(Continued)

(52) U.S. Cl.
CPC ............ *G09G 3/346* (2013.01); *G02B 6/003* (2013.01); *G02B 6/0076* (2013.01);
(Continued)

(58) Field of Classification Search
CPC ...... G09G 3/346; G09G 3/3413; G02B 6/003; G02B 27/0172; G02B 6/0076;
(Continued)

(56) References Cited

U.S. PATENT DOCUMENTS 5,416,876 A 5/1995 Ansley et al.
5,886,822 A 3/1999 Spitzer
(Continued)

FOREIGN PATENT DOCUMENTS

WO 2014030158 A1 2/2014

OTHER PUBLICATIONS

Kiyokawa, Kiyoshi, "A Wide Field-of-view Head Mounted Projective Display using Hyperbolic Half-silvered Mirrors", In Proceedings of 6th IEEE and ACM International Symposium on Mixed and Augmented Reality, Nov. 13, 2007, 4 pages.
(Continued)

*Primary Examiner* — Andrew Sasinowski
(74) *Attorney, Agent, or Firm* — Arent Fox LLP

(57) ABSTRACT

A display engine includes light emitting elements, an optical subsystem to produce a single collimated beam of light from the light emitted by the light emitting elements, one or more image producing MEMS mirrors, one or more image reprojecting MEMS mirrors, and a controller. One of the image producing MEMS mirror(s) is positioned to reflect the single beam of light produced by the optical subsystem. The controller controls the image producing MEMS mirror(s) and the image reprojecting MEMS mirror(s). The image reprojecting MEMS mirror(s) is/are controlled and is/are positioned relative to the image producing MEMS mirror(s) and relative to input-coupler(s) of optical waveguide(s) so that a pupil corresponding to a scanned image that the image producing MEMS mirror(s) project onto one of the image reprojecting MEMS mirror(s), is reprojected by the image reprojecting MEMS mirror(s) onto the input-coupler(s) of the optical waveguide(s) and thereby coupled into the optical waveguide(s).

20 Claims, 8 Drawing Sheets

(51) Int. Cl.
*G02B 27/01* (2006.01)
*G03B 21/00* (2006.01)

(52) U.S. Cl.
CPC ....... *G02B 27/0172* (2013.01); *G03B 21/008* (2013.01); *G09G 3/3413* (2013.01); *G02B 2027/0112* (2013.01); *G02B 2027/0125* (2013.01)

(58) Field of Classification Search
CPC .... G02B 2027/0125; G02B 2027/0112; G03B 21/008
See application file for complete search history.

(56) References Cited

U.S. PATENT DOCUMENTS

| | | | |
|---|---|---|---|
| 6,178,052 B1 | 1/2001 | Aoki et al. | |
| 8,319,762 B2 | 11/2012 | Kurozuka | |
| 8,817,379 B2 | 8/2014 | Saeedi et al. | |
| 9,122,060 B2 | 9/2015 | Nozaki | |
| 9,176,265 B2 | 11/2015 | Mukawa et al. | |
| 9,229,236 B2 | 1/2016 | Hino et al. | |
| 9,279,984 B2* | 3/2016 | Aiki | G02B 5/32 |
| 9,715,067 B1* | 7/2017 | Brown | G02B 27/0172 |
| 2004/0085649 A1* | 5/2004 | Repetto | G02B 27/0081 |
| | | | 359/633 |
| 2005/0253055 A1 | 11/2005 | Sprague et al. | |
| 2006/0228073 A1 | 10/2006 | Mukawa et al. | |
| 2008/0001850 A1 | 1/2008 | Champion et al. | |
| 2009/0279180 A1* | 11/2009 | Amitai | G02B 13/22 |
| | | | 359/633 |
| 2010/0046070 A1 | 2/2010 | Mukawa | |
| 2010/0149073 A1 | 6/2010 | Chaum et al. | |
| 2011/0249197 A1 | 10/2011 | Sprawl et al. | |
| 2013/0208362 A1 | 8/2013 | Bohn et al. | |
| 2014/0140653 A1 | 5/2014 | Brown et al. | |
| 2014/0204455 A1* | 7/2014 | Popovich | G02B 6/0028 |
| | | | 359/316 |
| 2015/0138446 A1* | 5/2015 | Sheng | G03B 21/008 |
| | | | 348/766 |
| 2015/0168718 A1 | 6/2015 | Lee | |
| 2015/0286056 A1* | 10/2015 | Takashima | G02B 27/0172 |
| | | | 359/633 |
| 2015/0370075 A1* | 12/2015 | Ato | G02B 27/017 |
| | | | 359/240 |
| 2016/0238845 A1 | 8/2016 | Alexander et al. | |

OTHER PUBLICATIONS

Hofmann, et al., "High-Q MEMS Resonators for Laser Beam Scanning Displays", In Journal of Micromachines, Jun. 6, 2012, pp. 509-528.

Kumar, et al., "MEMS Display: Emerging Technology for Next Generation Avionics Display", In International Journal of Computer Applications, vol. 45, Issue 4, May 2012, pp. 1-4.

Davis, W.O., "Optical MEMS for Displays in Portable Systems", Handbook of MEMS for Wireless and Mobile Applications, Dec. 2013, pp. 569-594.

"International Search Report and Written Opinion Issued in PCT Application No. PCT/US2017/051435", dated Nov. 28, 2017, 11 Pages.

* cited by examiner

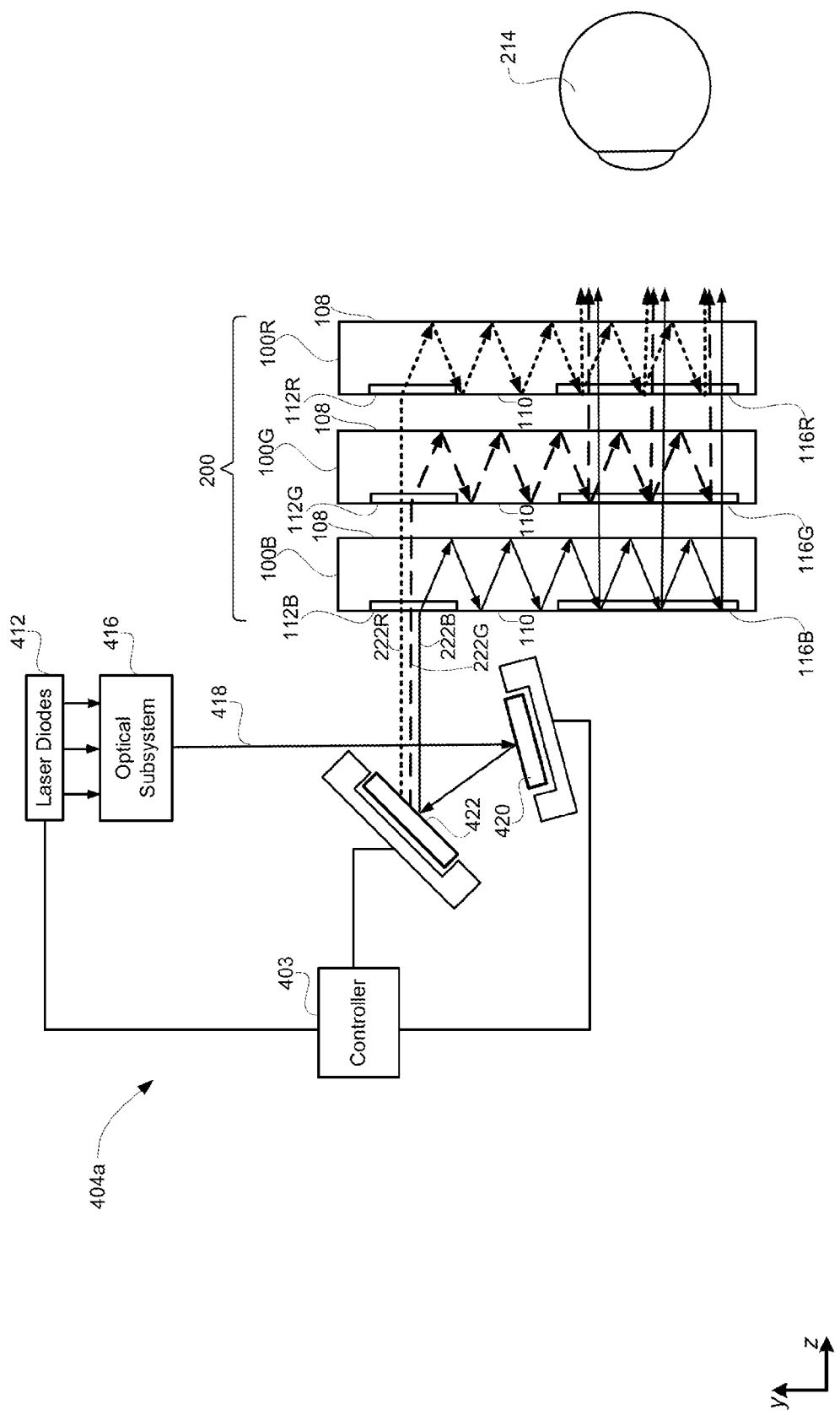

DISPLAY ENGINES FOR USE WITH OPTICAL WAVEGUIDES

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment.

These devices, which can be implemented as head-mounted display (HMD) glasses or other wearable near eye display devices, or as a heads up display (HUD), but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing a display engine and waveguides and/or other optical structures to display images of virtual objects to a user.

SUMMARY

Certain embodiments described herein relate to display engines for use with one or more optical waveguides that each include an input-coupler and an output-coupler. Each of the optical waveguide(s) is configured to cause light that is coupled into the optical waveguide by the input-coupler thereof, to travel by way of total internal reflection (TIR) to the output-coupler thereof where the light is coupled out of the waveguide. Such a display engine and the optical waveguide(s) can be components of a head-mounted display (HMD) system, a heads-up display (HUD) system or some other type of display system.

In accordance with an embodiment of the present technology, the display engine includes one or more light emitting elements each of which is configured to emit light in response to being driven. The display engine also includes an optical subsystem configured to produce a single collimated beam of light from the light emitted by the one or more light emitting elements. Additionally, the display engine includes one or more image producing MEMS mirrors and one or more image reprojecting MEMS mirrors, wherein one of the one or more image producing MEMS mirrors is positioned to reflect the single beam of light produced by the optical subsystem. The display engine also includes a controller configured to control the one or more image producing MEMS mirrors and the one or more image reprojecting MEMS mirrors. In accordance with specific embodiments, the one or more image reprojecting MEMS mirrors is/are controlled and is/are positioned relative to the one or more image producing MEMS mirrors and relative to the input-coupler(s) of the optical waveguide(s) so that a pupil corresponding to a scanned image that the one or more image producing MEMS mirrors project onto one of the one or more image reprojecting MEMS mirrors, is reprojected by the one or more image reprojecting MEMS mirrors onto the input-coupler(s) of the optical waveguide(s) and thereby coupled into the optical waveguide(s) by the input-coupler(s).

In accordance with certain embodiments, a size of the reprojected pupil at the input-coupler(s) is smaller than a size of the pupil that is projected onto one of the one or more image reprojecting MEMS mirrors by the one or more image producing MEMS mirrors. Beneficially, because the size of the reprojected pupil at the input-coupler(s) is smaller than the size of the pupil that is projected onto one of the one or more image reprojecting MEMS mirrors, the input-coupler(s) can be made smaller than would be possible if the pupil corresponding to the scanned image projected by the one or more image producing MEMS mirrors were projected directly onto the input-coupler(s). This advantageously mitigates that amount of the light that, after being coupled into the waveguide(s) by the input-coupler(s), may be inadvertently coupled out of the waveguide(s) 100 by the input-coupler(s) after reflecting off of a surface of the waveguide(s) 100.

In accordance with certain embodiments, the controller is configured to synchronously control the one or more image producing MEMS mirrors and the one or more image reprojecting MEMS mirrors. More specifically, the controller can be configured to produce a first fast axis control signal a first slow axis control signal that are respectively used to resonate fast and slow axes associated with the one or more image producing MEMS mirrors. Additionally, the controller can be configured to produce a second fast axis control signal a second slow axis control signal that are respectively used to resonate fast and slow axes associated with the one or more image reprojecting MEMS mirrors. In accordance with certain embodiments, the second fast axis control signal has a same frequency and a same shape as the first fast axis control signal but is offset in phase relative to the first fast axis control signal, and the second slow axis control signal has a same frequency and a same shape as the first slow axis control signal but is offset in phase relative to the first slow axis control signal. In accordance with certain embodiments, the second fast axis control signal is offset in phase by 180 degrees relative to the first fast axis control signal, and the second slow axis control signal is offset in phase by 180 degrees relative to the first slow axis control signal.

In accordance with certain embodiments of the present technology, each of the optical waveguide(s) includes first and second major planar surfaces that are substantially parallel to one another. Additionally, the optical subsystem and one of the one or more image producing MEMS mirrors are positioned relative to one another and relative to the optical waveguide(s) such that the single beam of light produced by the optical subsystem travels in free-space from the optical subsystem to the one of the one or more image producing MEMS mirrors in a direction that is substantially parallel to the first and second major planar surfaces of the optical waveguide(s).

Specific embodiments of the present technology are directed to a head-mounted display (HMD) or a heads-up display (HUD) system that includes a plurality of optical waveguides, a plurality of light emitting elements, an optical subsystem, a biaxial image producing MEMS mirror, and a biaxial image reprojecting MEMS mirror. The plurality of optical waveguides each include an input-coupler and an output-coupler. Each of the optical waveguides is configured to cause light that is coupled into the optical waveguide by the input-coupler thereof, to travel by way of TIR to the output-coupler thereof where the light is coupled out of the waveguide. Each of the optical-waveguides can also include an intermediate-component, examples of which are described below in the discussion of FIGS. 1A-1C with reference to the component labeled 114. The plurality of light emitting elements, which can be, e.g., laser diodes, are each configured to emit light of a different color than the other light emitting elements in response to being driven. The optical subsystem is configured to produce a single collimated beam of light from the light emitted by the plurality of light emitting elements. The biaxial image producing MEMS mirror is positioned to reflect the single beam of light produced by the optical subsystem. The biaxial image reprojecting MEMS mirror is positioned relative to the biaxial image producing MEMS mirror and the input-couplers of the optical waveguides so that a pupil that is reflected off of the biaxial image producing MEMS mirror can be reprojected by the biaxial image reprojecting MEMS mirror onto the input-couplers of the optical waveguides.

In accordance with certain embodiments, the system also includes a controller that is configured to synchronously control the biaxial image producing MEMS mirror and the biaxial image reprojecting MEMS mirror. More specifically, the controller can be configured to produce a first fast axis control signal and a first slow axis control signal that are respectively used to resonate fast and slow axes associated with the biaxial image producing MEMS mirror to produce a pupil corresponding to a scanned image that is projected onto the biaxial image reprojecting MEMS mirror. Additionally, the controller can be configured to produce a second fast axis control signal and a second slow axis control signal that are respectively used to resonate fast and slow axes associated with the biaxial image reprojecting MEMS mirror so that the pupil corresponding to the scanned image, that is projected onto the biaxial image reprojecting MEMS mirror, is reprojected onto the input-couplers of the optical waveguides and thereby coupled into the optical waveguides by the input-couplers. In accordance with certain embodiments, the second fast axis control signal is offset in phase by 180 degrees relative to the first fast axis control signal, and the second slow axis control signal is offset in phase by 180 degrees relative to the first slow axis control signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4A illustrates a display engine, according to an embodiment of the present technology, that includes a biaxial image producing MEMS mirror and a biaxial image reprojecting MEMS mirror.

DETAILED DESCRIPTION

Figure 1:
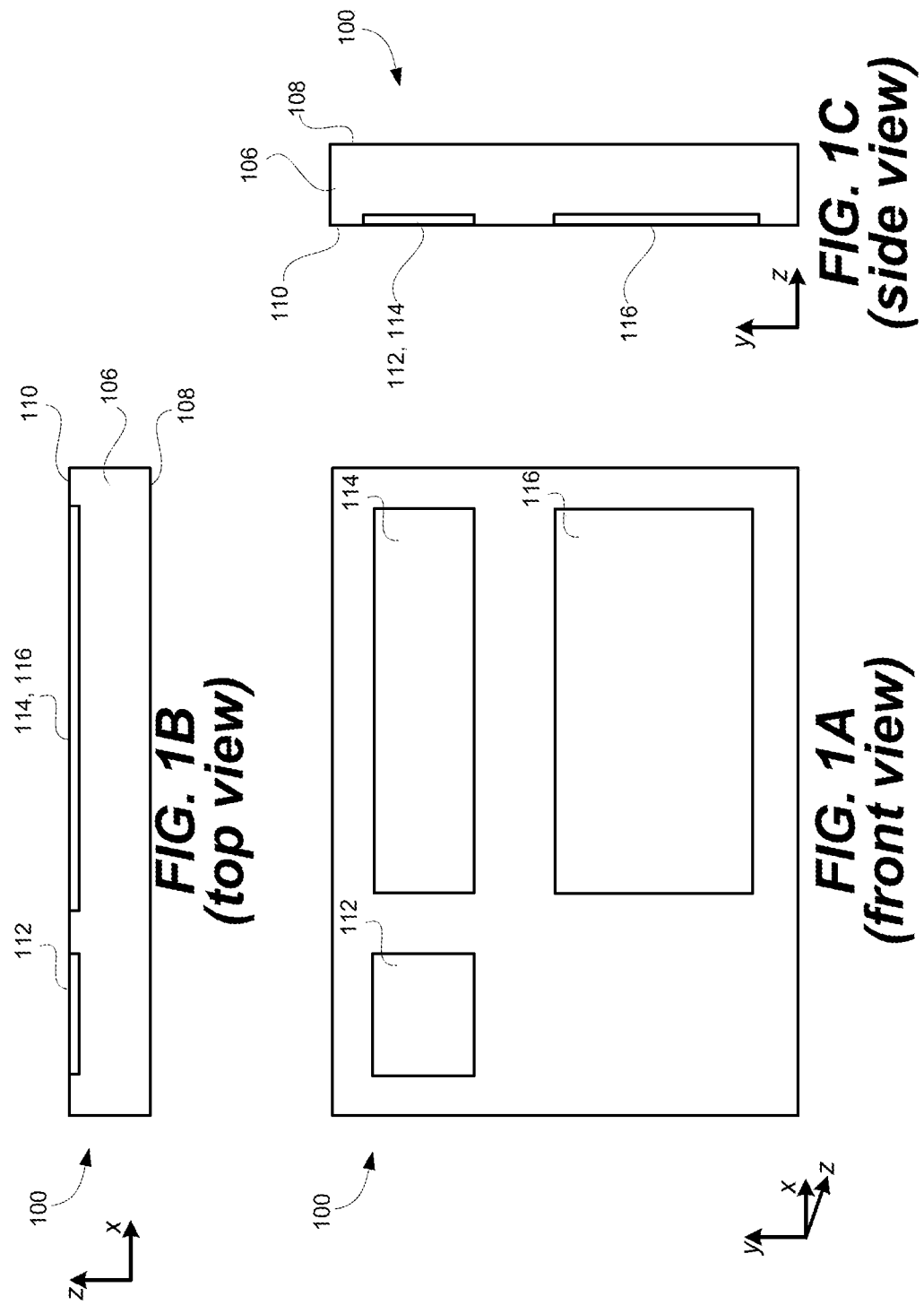
FIGS. 1A, 1B and 1C are front, top and side views, respectively, of an exemplary waveguide that can be used to replicate an image associated with an input-pupil to an expanded output-pupil.

Certain embodiments of the present technology relate to display engines for use with one or more optical waveguides that each include an input-coupler and an output-coupler. Each of the optical waveguide(s) is configured to cause light that is coupled into the optical waveguide by the input-coupler thereof, to travel by way of total internal reflection (TI R) to the output-coupler thereof where the light is coupled out of the waveguide. The display engine and the optical waveguide(s) can be components of a head-mounted display (HMD) system or a heads-up display (HUD) system, or some other display system. Such embodiments utilize MEMS mirrors to implement display engines to make the display engines smaller, lighter and more energy efficient than alternative types of display engines, such as those that include LCOS displays. However, prior to describing details of such embodiments, exemplary optical waveguides and exemplary display systems including such waveguides are initially described with reference to FIGS. 1 and 2.

In the description that follows, like numerals or reference designators will be used to refer to like parts or elements throughout. In addition, the first digit of a three digit reference number identifies the drawing in which the reference number first appears.

FIGS. 1A, 1B and 1C are front, top and side views, respectively, of an exemplary optical waveguide 100 that can be part of a waveguide assembly that is used to replicate an image associated with an input-pupil to an expanded output-pupil. The term "input-pupil," as used herein, can refer to an aperture through which light corresponding to an image is overlaid on one or more input-couplers of one or more waveguides. The term "output-pupil," as used herein, can refer to an aperture through which light corresponding to an image exits one or more output-couplers of one or more waveguides. The term "output-pupil" can also be used refer to an aperture through which light corresponding to an image exits a display engine, examples of which are described below. More generally, the term "pupil" is used to refer to an aperture through which a light corresponding to an image travels. The optical waveguide 100 will often be referred to hereafter more succinctly simply as a waveguide 100. As will be discussed in further detail below with reference to FIG. 2, the image that the waveguide 100 is being used to replicate, and likely also expand, can be generated using a display engine that includes a light source assembly and an imaging device.

Referring to FIGS. 1A, 1B and 1C, the optical waveguide 100 includes a bulk-substrate 106 having an input-coupler 112 and an output-coupler 116. The input-coupler 112 is configured to couple light corresponding to an image associated with an input-pupil into the bulk-substrate 106 of the waveguide. The output-coupler 116 is configured to couple the light corresponding to the image associated with the input-pupil, which travels in the optical waveguide 100 from the input-coupler 112 to the output-coupler 116, out of the waveguide 100 so that the light is output and imaged from the output-pupil associated with the waveguide.

The bulk-substrate 106, which can be made of glass or optical plastic, but is not limited thereto, includes a first major planar surface 108 and a second major planar surface 110 opposite and parallel to the first major planar surface 108. The first major planar surface 108 can alternatively be referred to as the front-side major surface 108 (or more simply the front-side surface 108), and the second major planar surface 110 can alternatively be referred to as the back-side major surface 110 (or more simply the back-side surface 110). As the term "bulk" is used herein, a substrate is considered to be "bulk" substrate where the thickness of the substrate (between its major surfaces) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 6200 nm, i.e., at least 6.2 µm. In accordance with certain embodiments, the bulk-substrate 106 has a thickness of at least 25 µm between its major planar surfaces 108 and 110. In specific embodiments, the bulk-substrate 106 has a thickness (between its major surfaces) within a range of 25 µm to 1000 µm. The bulk-substrate 106, and more generally the waveguide 100, is transparent, meaning that it allows light to pass through it so that a user can see through the waveguide 100 and observe objects on an opposite side of the waveguide 100 than the user's eye(s).

The optical waveguide 100 in FIGS. 1A, 1B and 1C is also shown as including an intermediate-component 114, which can alternatively be referred to as an intermediate-zone 114. Where the waveguide 100 includes the intermediate-component 114, the input-coupler 112 is configured to couple light into the waveguide 100 (and more specifically, into the bulk-substrate 106 of the waveguide 100) and in a direction of the intermediate-component 114. The intermediate-component 114 is configured to redirect such light in a direction of the output-coupler 116. Further, the intermediate-component 114 is configured to perform one of horizontal or vertical pupil expansion, and the output-coupler 116 is configured to perform the other one of horizontal or vertical pupil expansion. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 1A, then the intermediate-component 114 can be configured to perform vertical pupil expansion, and the output-coupler 116 can be configured to perform horizontal pupil expansion. Such pupil expansion provides for an increased eye box, compared to if pupil expansion were not performed, thereby making the embodiments described herein practical for use in a near eye or heads up display. In certain embodiments, the intermediate-component is configured as a fold-grating. In other embodiments, the intermediate-component is a mirror based component, rather than a grating based component.

The input-coupler 112, the intermediate-component 114 and the output-coupler 116 can be referred to collectively herein as optical components 112, 114 and 116 of the waveguide, or more succinctly as components 112, 114 and 116. It is possible that a waveguide includes an input-coupler and an output-coupler, without including an intermediate-components. In such embodiments, the input-coupler would be configured to couple light into the waveguide and in a direction toward the output-coupler. In such embodiments, the output-coupler can provide one of horizontal or vertical pupil expansion, depending upon implementation.

In FIG. 1A, the input-coupler 112, the intermediate-component 114 and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

As can best be appreciated from FIGS. 1B and 1C, the input-coupler 112, the intermediate-component 114 and the output-coupler 116 are all shown as being provided in or on a same surface (i.e., the back-side surface 110) of the waveguide 100. In such a case, the input-coupler 112 can be transmissive (e.g., a transmission grating), the intermediate-component 114 can be reflective (e.g., a reflective grating), and the output-coupler 116 can also be reflective (e.g., a further reflective grating). The input-coupler 112, the intermediate-component 114 and the output-coupler 116 can alternatively all be provided in the front-side surface 110 of the waveguide 100. In such a case, the input-coupler 112 can be reflective (e.g., a reflective grating), the intermediate-component 114 can be reflective (e.g., a further reflective grating), and the output-coupler 116 can also be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major surfaces 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major surfaces 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side surface 108 of the waveguide 100, another one of the components 112, 114 and 116 is provided in or on the back-side surface 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major planar surfaces 108 or 110 of the bulk-substrate 106, or embedded therebetween. It is also possible that one or more of the input-coupler 112, the intermediate-component 114 and the output-coupler 116 is provided in or on both the front-side surface 108 of the waveguide 100 and the back-side surface 110 of the waveguide 100.

The input-coupler 112, the intermediate-component 114 and the output-coupler 116 can each be implemented as a diffraction grating, or more generally, as a diffractive optical element (DOE). Such DOEs can be produced using holographic processes, in which case, the DOEs can be more specifically referred to a holographic optical elements (HOEs). The input-coupler 112 can alternatively be implemented as a prism, a reflective polarizer or can be mirror based. Similarly, the output-coupler 116 can alternatively be implemented as a prism, a reflective polarizer or can be mirror based. Depending upon the specific configuration and implementation, any one of the input-coupler 112, the intermediate-component 114 and the output-coupler 116 can be reflective, diffractive or refractive, or a combination thereof, and can be implemented, e.g., as a linear grating type of coupler, a holographic grating type of coupler, a prism or another type of optical coupler. The intermediate-component 114, as noted above, can be implemented using a fold-grating, or can alternatively be implemented as a mirror based pupil expander, but is not limited thereto. Where the input-coupler 112 is a diffraction grating, it can be referred to more specifically as an input diffraction grating 112. Where the intermediate-component 114 is a diffraction grating, it can be referred to more specifically as an intermediate diffraction grating 114. Similarly, where the output-coupler 116 is a diffraction grating, it can be referred to more specifically as an output diffraction grating 116.

A diffraction grating is an optical component that may contain a periodic structure that causes incident light to split and change direction due to an optical phenomenon known as diffraction. The splitting (known as optical orders) and angle change depend on the characteristics of the diffraction grating. When the periodic structure is on the surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". The nature of the diffraction by an SRG depends on the wavelength, polarization and angle of light incident on the SRG and various optical characteristics of the SRG, such as refractive index, line spacing, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g. when the DOE is an SRG), the portion of that surface spanned by that DOE can be referred to as a DOE area. A diffraction grating, instead of being a surface grating, can alternatively be a volume grating, such as a Bragg diffraction grating. It is also possible that one or more of the couplers are manufactured as SRGs and then covered within another material, e.g., using an aluminum deposition process, thereby essentially burying the SRGs such that the major planar waveguide surface(s) including the SRG(s) is/are substantially smooth. Such a coupler is one example of a hybrid of a surface and volume diffraction grating. Any one of the input-coupler 112, the intermediate-component 114 and the output-coupler 116 can be, e.g., a surface diffraction grating, or a volume diffraction grating, or a hybrid of a surface and volume diffraction grating. Each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Where the input-coupler 112, the intermediate-component 114 and/or the output-coupler 116 is an SRG, each such SRG can be etched into one of the major planar surfaces 108 or 110 of the bulk-substrate 106. In such embodiments, the SRG can be said to be formed "in" the bulk-substrate 106. Alternatively, each SRG can be physically formed in a coating that covers one of the major planar surfaces 108 or 110 of the bulk-substrate 106, in which case each such SRG can be said to be formed "on" the bulk-substrate 106. Either way, the components 112, 114 and 116 are considered parts of the waveguide 100.

Referring specifically to FIG. 1A, in an exemplary embodiment, the input-coupler 112 can have surface gratings that extend in a vertical (y) direction, the output-coupler 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible and within the scope of embodiments of the present technology.

More generally, the input-coupler 112, the intermediate-component 114 and the output-coupler 116 can have various different outer peripheral geometries, can be provided in or on either of the major planar surfaces of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 116, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ the critical angle for two optical mediums (e.g., the bulk-substrate 106, and air or some other medium that is adjacent to the bulk-substrate 106) that meet at a medium boundary, n1 is the index of refraction of the optical medium in which light is traveling towards the medium boundary (e.g., the bulk-substrate 106, once the light is couple therein), and n2 is the index of refraction of the optical medium beyond the medium boundary (e.g., air or some other medium adjacent to the bulk-substrate 106).

The concept of light traveling through the waveguide 100, from the input-coupler 112 to the output-coupler 116, by way of TIR, can be better appreciated from FIG. 2, which is discussed below.

Figure 2:
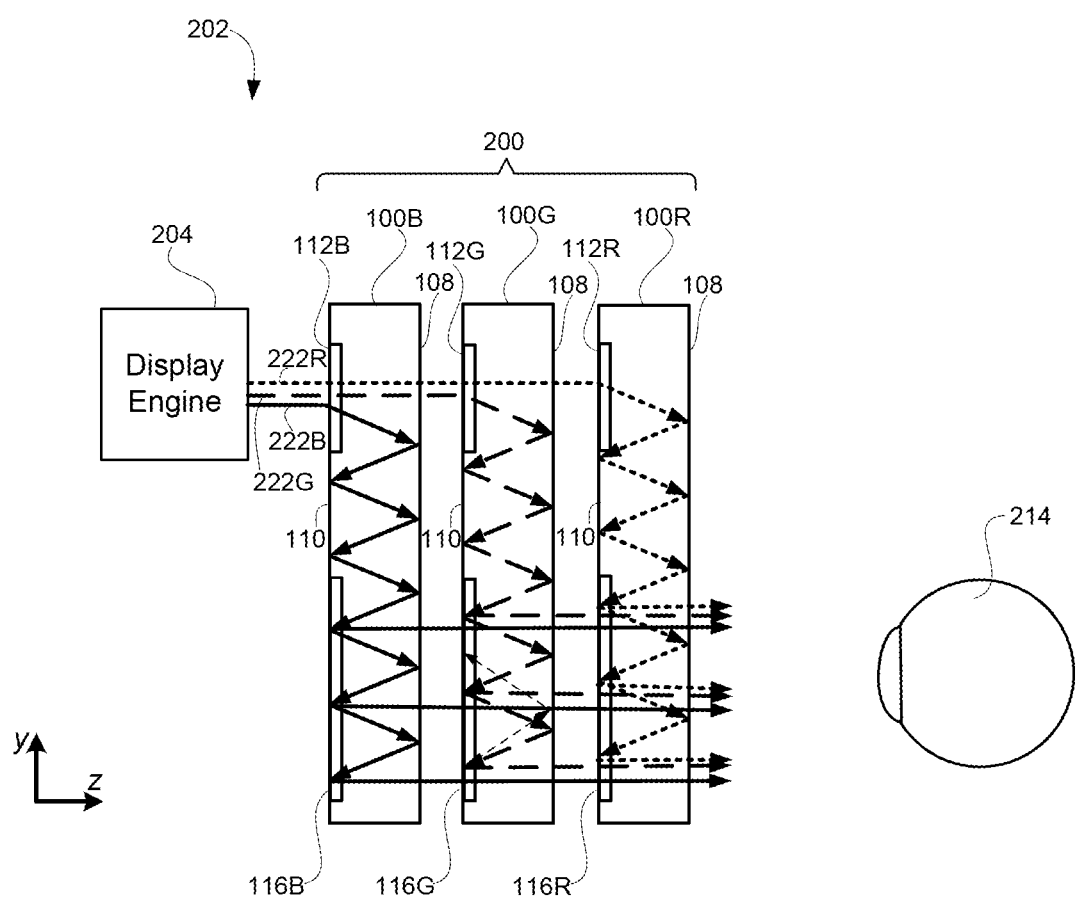
FIG. 2 is side view of the exemplary display system including a plurality of the waveguides introduced with reference to FIGS. 1A, 1B and 1C, and also shows a display engine that generates an image associated with an input-pupil and including angular content that is coupled into the waveguides by respective input-couplers, and also shows an eye that is viewing the image within an eye box that is proximate output-couplers of the waveguides.

Referring to FIG. 2, a side view of an exemplary display system 202 is shown therein. The display system 202 is shown as including three waveguides labeled 100R, 100G, 100B (each of which can be similar to the waveguide 100 introduced with reference to FIGS. 1A, 1B and 1C) and a display engine 204 that generates an image including angular content that is coupled into the waveguides 100R, 100G and 100B by the input-couplers 112R, 112G and 112B. FIG. 2 also shows a human eye 214 that is viewing the image (as a virtual image) within an eye box that is proximate the output-couplers 116R, 116G and 116B. Explained another way, the human eye 214 is viewing the image from an output-pupil associated with the waveguides 100R, 100G and 100G. The display system 202 can be, e.g., a near eye display (NED) or a heads up display (HUD) system, but is not limited thereto.

The optical waveguides 100R, 100G and 100B can be configured, respectively, to transfer red, green and blue light corresponding to an image from an input-pupil to an output-pupil. More specifically, an input-coupler 112R of the waveguide 100R can be configured to couple light (corresponding to the image) within a red wavelength range into the waveguide 100R, and the output-coupler 116R of the waveguide 100R can be configured to couple light (corresponding to the image) within the red wavelength range (which has traveled from the input-coupler 112R to the output-coupler 116F by way of TIR) out of the waveguide 100R. Similarly, an input-coupler 112G of the waveguide 100G can be configured to couple light (corresponding to the image) within a green wavelength range into the waveguide 100G, and the output-coupler 116G of the waveguide 100G can be configured to couple light (corresponding to the image) within the green wavelength range (which has traveled from the input-coupler 112G to the output-coupler 116G by way of TIR) out of the waveguide 100G. Further, an input-coupler 112B of the waveguide 100B can be configured to couple light (corresponding to the image) within a blue wavelength range into the waveguide 100B, and the output-coupler 116B of the waveguide 100B can be configured to couple light (corresponding to the image) within the blue wavelength range (which has traveled from the input-coupler 112B to the output-coupler 116B by way of TIR) out of the waveguide 100B. In accordance with an embodiment, the red wavelength range is from 600 nm to 650 nm, the green wavelength range is from 500 nm to 550 nm, and the blue wavelength range is from 430 nm to 480 nn. Other wavelength ranges are also possible.

When implemented as an input diffraction grating, the input-coupler 112B is designed to diffract blue light within an input angular range (e.g., +/−15 degrees relative to the normal) and within the blue wavelength range (e.g., from 430 nm to 480 nn) into the waveguide 100B, such that an angle of the diffractively in-coupled blue light exceeds the critical angle for the waveguide 100B and can thereby travel by way of TIR from the input-coupler 112B to the output-coupler 116B. Further, the input-coupler 112B is designed to transmit light outside the blue wavelength range, so that light outside the blue wavelength range (such as light within the green and red wavelength ranges) will pass through the waveguide 100B.

When implemented as an input diffraction grating, the input-coupler 112G is designed to diffract green light within an input angular range (e.g., +/−15 degrees relative to the normal) and within the green wavelength range (e.g., from 500 nm to 550 nm) into the waveguide 100G, such that an angle of the diffractively in-coupled green light exceeds the critical angle for the waveguide 100G and can thereby travel by way of TIR from the input-coupler 112G to the output-coupler 116G. Further, the input-coupler 112G is designed to transmit light outside the green wavelength range, so that light outside the green wavelength range (such as light within the red wavelength range) will pass through the waveguide 100G.

When implemented as an input diffraction grating, the input-coupler 112R is designed to diffract red light within an input angular range (e.g., +/−15 degrees relative to the normal) and within the red wavelength range (e.g., from 600 nm to 650 nm) into the waveguide 100R, such that an angle of the diffractively in-coupled red light exceeds the critical angle for the waveguide 100R and can thereby travel by way of TIR from the input-coupler 112R to the output-coupler 116R. Further, the input-coupler 112R is designed to transmit light outside the red wavelength range, so that light outside the red wavelength range will pass through the waveguide 100R.

More generally, each of the waveguides 100 can include an input-coupler 112 that is configured to couple-in light within an input angular range (e.g., +/−15 degrees relative to the normal) and within a specific wavelength range into the waveguide, such that an angle of the in-coupled light exceeds the critical angle for the waveguide 100 and can thereby travel by way of TIR from the input-coupler 112 to the output-coupler 116 of the waveguide 100, and such that light outside the specific wavelength range is transmitted and passes through the waveguide 100.

The optical waveguides 100R, 100G and 100B can be referred to collectively as the waveguides 100, or individually as a waveguide 100. Two or more of the waveguides 100 can be referred to as a waveguide assembly 200. More specifically, multiple waveguides 100 can be stacked, back-to-back, to provide the waveguide assembly 200. The distance between adjacent waveguides 100 of the waveguide assembly 200 can be, e.g., between approximately 50 micrometers (μm) and 300 μm, but is not limited thereto. While not specifically shown, spacers can be located between adjacent waveguides 100 to maintain a desired spacing therebetween. The input-couplers 112G, 112R and 112B can be referred to collectively as the input-couplers 112, or individually as an input-coupler 112. Similarly, the output-couplers 116G, 116R and 116B can be referred to collectively as the output-couplers 116, or individually as an output-coupler 116. While the waveguide assembly 200 is shown as including three waveguides 100, it is also possible that a waveguide assembly include more or less than three waveguides, as will be described in additional detail below.

Each of the input-couplers 112 have an input angular range, and each of the output-coupler 116 have an output angular range. In accordance with certain embodiments, all of the input-couplers 112 have substantially the same input angular range, and all of the output-couplers 116 have substantially the same output angular range. In accordance with certain embodiments, the input angular range for the input-couplers 112 is substantially the same as the output angular range for the output-couplers 116. Values are considered to be substantially the same if they are within 5% of one another. In accordance with certain embodiments, the input angular range and the output angular range are each approximately +/−15 degrees relative to the normal. Smaller or larger input and output angular ranges are also possible, and within the scope of embodiments described herein.

In FIG. 2, the dotted arrowed line 222R is representative of red (R) light corresponding to an image that is output by the display engine 204, the dashed arrowed line 222G is representative of green (G) light corresponding to the image that is output by the display engine 204, and the solid arrowed line 222B is representative of blue (B) light corresponding to the image that is output by the display engine 204. While the R, G and B light (222R, 222G and 22B) is shown as being spatially offset from one another, this is likely not the case, but rather, FIG. 2 was drawn in this manner so that the R, G and B light can be separately represented. More likely, the R, G and B light (222R, 222G and 22B) that exits the display engine 204 would completely overlap one another. Further, while the waveguides 100R, 100G and 100B are shown as being stacked in a specific order, the order in which the waveguides 100 are stacked can be changed.

The display engine 204 can include, e.g., an imaging device (also known as an image former), an imaging lens and a light source assembly (also known as an illuminator, or simply as a light source), but is not limited thereto. The imaging device of the display engine 204 can be implemented using a liquid crystal on silicon (LCOS) display, which is a type of reflective technology for which external light is reflected and modulated by an optically active material. Where the imaging device 206 is an LCOS display, the light source assembly would likely include red, green and blue light emitting diodes (LEDs). However, a disadvantage of using an LCOS display to implement the display engine it that the resulting display engine is larger and heavier than desired, e.g., due to the polarizing beam splitter cubes that are typically used in an LCOS display. It would be desirable for the volume of the display engine 204 to be no larger than 25 mm×12 mm×12 mm, and no heavier than about 25 grams. However, where the imaging device is implemented as an LCOS display, and the light source assembly is implemented using LEDs, it has proved difficult to make the display engine 204 any smaller than about 50 mm×50 mm×25 mm, and it has proved difficult to make the display engine any lighter than about 70 grams. Further, in order to reduce power consumption, it would be desirable to use laser diodes (LDs) in place of LEDs within the light source assembly, since LDs are more power efficient than LEDs.

In FIG. 2, the display engine 204 is shown as facing the back-side surface 110 of the waveguides 100, and the eye 214 is shown as facing the front-side surfaces 108 opposite and parallel to the back-side surfaces 110. This provides for a periscope type of configuration in which light enters the waveguide on one side of the waveguides 100, and exits the waveguide at an opposite side of the waveguides 100. Alternatively, the input-couplers 112 and the output-couplers 116 can be implemented in a manner such that the display engine 204 and the eye 214 are proximate to and face a same major planar surface (108 or 110).

The waveguide assembly 200 can be incorporated into a see-through mixed reality display device system, but is not limited to use therewith. A separate instance of the waveguide assembly 200 and the display engine 204 can be provided for each of the left and right eyes of a user. In certain embodiments, such waveguide assemblies 200 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide assembly for each of the left and right eyes of a user, there can be a separate display engine for each of the waveguide assemblies, and thus, for each of the left and right eyes of the user. One or more further adjacent waveguides can be used to perform eye tracking based on infrared light that is incident on and reflected from the user's eye(s) 214, as is known in the art.

One way to reduce the size, weight and power consumption of the display engine 204 is to implement the imaging device (also known as an image former) using scanning MEMS (Microelectromechanical systems) mirror display technology, instead of LCOS display technology, and implement the light source assembly using LDs, instead of LEDs. One way to accomplish this is shown in and described with reference to FIG. 3.

Figure 3:
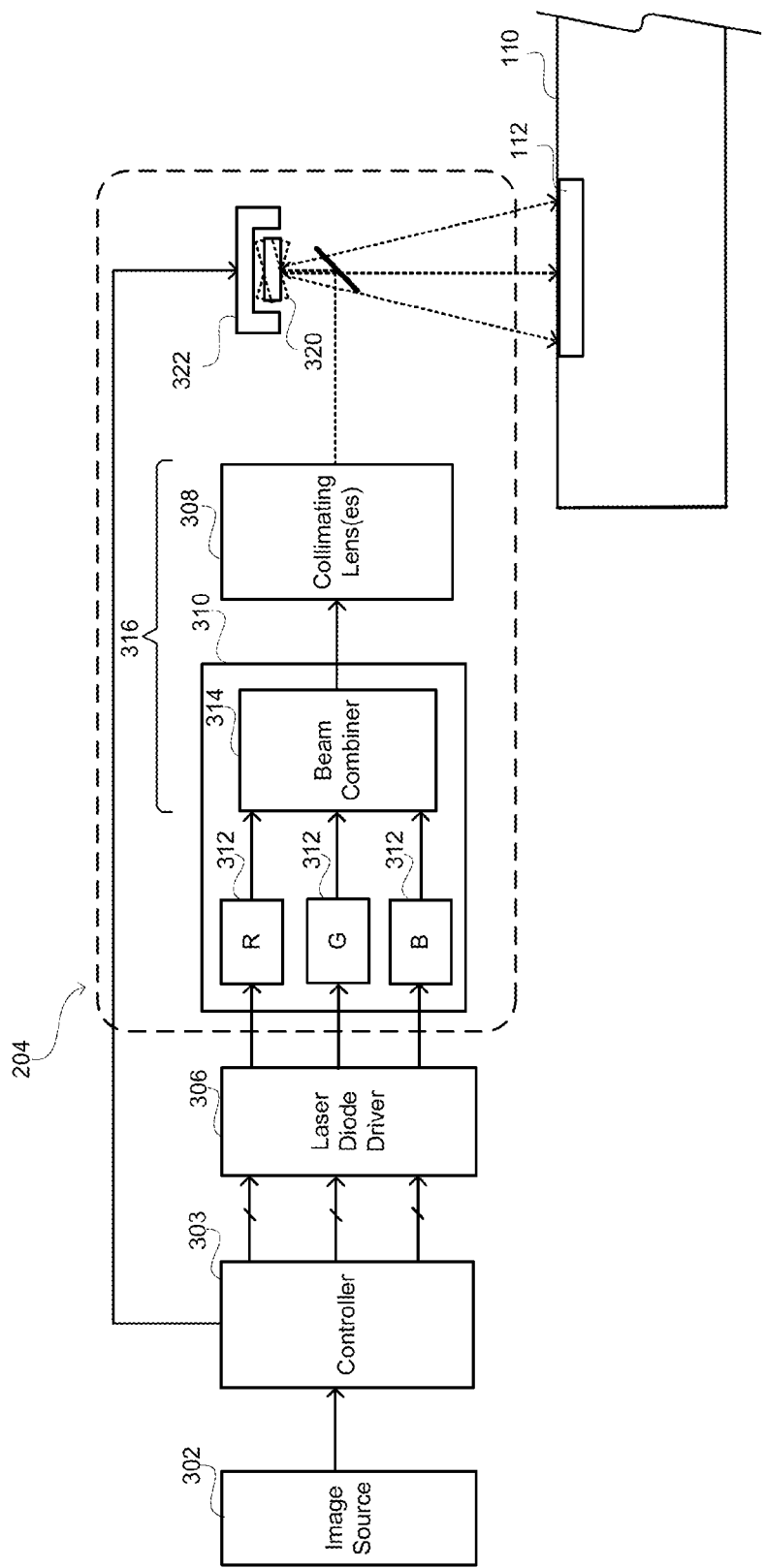
FIG. 3 illustrates exemplary details of the display engine introduced with reference to FIG. 2.

FIG. 3 illustrates exemplary details of the display engine 204, according to an exemplary embodiment of the present technology. The display engine 204 is shown as including a light source assembly 310, one or more collimating lens(es) 308, and one or more scanning MEMS mirror(s) 320. The light source assembly 310 is shown as include red (R), green (G) and blue (B) laser diodes (LDs) 312, and a beam combiner 314. Also shown in FIG. 3 is an image source 302, a controller 303 and a laser diode driver (LDD) 306, any one or all of which can be considered to be external to the display engine 204, or can be implemented as part of the display engine 204, depending upon implementation. Unless stated otherwise, it is assumed that the image source 302, the portion of the controller that drives the LDD 306, and the LDD 306 are external to the display engine 204. However, it is assumed that the portion of the controller 303 that controls the scanning MEMs mirror(s) 320, or some other controller that controls the scanning MEMs mirror(s) 320, is part of the display engine 204.

The controller 303, which can be implemented using an application specific integrated circuit (ASIC) and/or a micro-controller, but is not limited thereto, is shown as receiving an image signal from the image source 302. The controller 303 can receive, e.g., red (R), green (G) and blue (B) pixel data, a horizontal synchronization (Hsync) signal, and a vertical synchronization (Vsync) signal from the image source 302. The Hsync signal can include one pulse per horizontal line of a frame, which indicates the end of one line and the beginning of the next line. The Vsync signal can include one pulse per frame, which indicates the end of one frame and the beginning of the next frame.

The controller 303 can perform gamma correction, color space conversion, interpolation, decimation, and/or the like. The controller 303 can also produce drive signals and control signals for producing an image including angular content that is coupled into one or more waveguides 100 by one or more input-couplers 112. More specifically, the controller 303 is shown as providing R, G and B digital drive signals to the LDD 306, which converts such digital signals to analog R, G and B drive signals which are used to drive R, G and B laser diodes (LDs) 312, thereby causing the LDs 312 to selectively emit R, G and B laser beams.

The beam combiner 314 can include dichroic filters, and/or other beam combiner optics, to combine the red, green and blue laser beams (produced by red, green and blue LDs 312) into a single laser beam, which can also be referred to as a light beam, that is provided to the one or more collimating lens(es) 308. The collimating lens(es) 308 collimate the light beam output by the beam combiner 314, and the collimated light beam is provided to the one or more MEMS scanning mirrors 320. The beam combiner 314 and the collimating lens(es) 308 are collectively an example of an optical subsystem that is configured to combine and collimate the light emitted by a plurality of light emitting elements (e.g., the R, G and B LDs 312) into a single beam of light. Alternatively optical subsystems can be used to combine and collimate the light emitted by a plurality of light emitting elements into a single beam of light, as would be known to one or ordinary skill in the art.

The controller 303 can also produce a fast axis control signal and a slow axis control signal that are used to control the scanning mirror(s) 320. The fast axis control signal is sometimes referred to as a horizontal (H) control signal, and the slow axis control signal is sometimes referred to as a vertical (V) control signal. The fast and slow axis control signals, also known as the H and V control signals, that are produced by the controller 303 and used to control the scanning mirror(s) 320 may be provided to a mirror drive unit and/or scanning platform (represented by element 322) that changes the position of the mirror(s) in response to the H and V control signals.

The MEMS mirror(s) 320, which can be controlled by the controller 303, can raster-scan reflected light onto an input-pupil associated with the input-coupler 112. In other words, the collimating lens(es) 308 and the MEMS mirror(s) 320 project and form a pupil at the location of the input-coupler(s) 112 of the waveguide(s) 100. In accordance with an embodiment, an input-pupil associated with the waveguide may be approximately the same size as an output-pupil associated with the display engine 204, e.g., 5 mm or less in some embodiments, but is not limited thereto. The MEMS mirror(s) 320 can be implemented, for example, using a single MEMS mirror (which is often referred to as a biaxial MEMS mirror) or using two uniaxial MEMS mirrors. A feedback signal can be provided from the MEMS mirror(s) 320 to the controller 303 to provide real time position information to the controller 303. It would also be possible to separate the controller 303 into two functional blocks or circuits, one which performs video or other image processing and provides RGB data to the LDD 306, and the other (e.g., a MEMS controller, or more generally a controller) which controls the scanning MEMS mirror(s) 320.

In accordance with certain embodiments, the output-pupil associated with the display engine 204 is preferably no larger than 5 mm in diameter, and more preferably within the range from 2 mm to 4 mm in diameter, and even more preferably within the range from about 3 mm to 3.5 mm in diameter. This would ensure that the input-coupler 112 of the waveguide(s) 100 is no larger than 5 mm in diameter. A potential problem with the input-coupler 112 of the waveguide(s) 100 being larger than 5 mm in diameter is that a relatively large amount of the light that is coupled into the waveguide(s) 100 by the input-coupler(s) 112 may be inadvertently coupled out of the waveguide(s) 100, by the input-coupler(s) 112, after reflecting off of a surface of the waveguide(s) 100. This can have the adverse effect of reducing the optical efficiency of a system, potentially resulting in low intensity and low quality virtual images.

It would be difficult, and potentially not possible, to have an output-pupil associated with the display engine 204 be no larger than 5 mm in diameter, where the image generated by the display engine 204 is produced using a single biaxial MEMS mirror, or using just two uniaxial MEMS mirrors. This is due to the MEMS mirror(s) 320 diverging the collimated light beam received from the collimating lens(es) before the light beam is projected onto the input-coupler(s) 112 of the waveguide(s) 100. In accordance with specific embodiments of the present technology, one or more additional MEMS mirrors are added and controlled in a manner that reduces the size of the output-pupil associated with the display engine 204, and thereby, enables the input-pupil and input-coupler(s) 112 associated with the waveguide(s) 100 to have a diameter that is 5 mm or less. This advantageously mitigates that amount of the light that, after being coupled into the waveguide(s) 100 by the input-coupler(s) 112, may be inadvertently coupled out of the waveguide(s) 100 by the input-coupler(s) 112 after reflecting off of a surface of the waveguide(s) 100.

More specifically, in accordance with certain embodiments of the present technology, a display engine includes one or more image producing MEMS mirrors, as well as one or more image reprojecting MEMS mirrors. The display engine is for use with one or more optical waveguides (e.g., 100) that each include an input-coupler (e.g., 112) and an output-coupler (e.g., 116), wherein each optical waveguide is configured to cause light that is coupled into the optical waveguide by the input-coupler, to travel by way of TIR to the output-coupler where the light is coupled out of the waveguide. The image producing MEMS mirror(s) is/are positioned to reflect a single beam of light (that is produced by an optical subsystem that combines and collimates light emitted by a plurality of light emitting elements) to produce a pupil corresponding to a scanned image that is projected onto a predetermined projection area that is distinct from the input-coupler(s) of the waveguide(s). The image reprojecting MEMS mirror(s) is/are controlled and is/are positioned relative to the image producing MEMS mirror(s), and relative to the input-coupler(s) of one or more optical waveguide(s), so that the pupil corresponding to the scanned image that the image producing MEMS mirror(s) project onto the predetermined projection area, at which is located one of the image reprojecting MEMS mirror(s), is reprojected by the image reprojecting MEMS mirror(s) onto the input-coupler(s) of the optical waveguide(s) 100 and thereby coupled into the optical waveguide(s) by the input-coupler(s). Various different implementations of such embodiments are described below with reference to FIGS. 4A-4D.

Referring to FIG. 4A, a display engine 404a is shown as including a biaxial image producing MEMS mirror 420, a biaxial image reprojecting MEMS mirror 422, and a controller 403. Also shown in FIG. 4A are a plurality of laser diodes (LDs) 412, each of which is configured to emit light of a different color (e.g., red, green or blue) than the other LDs. FIG. 4A also shows an optical subsystem 416 that is configured to combine and collimate the light emitted by the plurality of LDs 412 into a single beam of light 418. The optical subsystem 416 can include, e.g., a beam combiner (similar to the beam combiner 314 in FIG. 3) and one or more collimating lenses (similar to the collimating lens(es) 308 in FIG. 3), but is not limited thereto. The controller 403 is configured to synchronously control the biaxial image producing MEMS mirror 420 and the biaxial image reprojecting MEMS mirror 422 is shown in FIG. 4A. If the image that is being produced is a monochromatic image, then there may only be a single laser diode and a single waveguide 100.

Still referring to FIG. 4A, the biaxial image producing MEMS mirror 420 is positioned to reflect the single beam of light 418 that is produced by the optical subsystem 416. The biaxial image producing MEMS mirror 420 and the biaxial image reprojecting MEMS mirror 422 are positioned relative to one another, and the biaxial image producing MEMS mirror 420 is controlled by the controller 403, to produce a pupil corresponding to a scanned image that is projected onto the biaxial image reprojecting MEMS mirror 422. The biaxial image reprojecting MEMS mirror 422 reprojects the pupil corresponding to the scanned image (produced by the biaxial image producing MEMS mirror 420) onto the input-coupler(s) 112 of the optical waveguide(s) 100, and thereby causes the scanned image to be coupled into the optical waveguide(s) 100 by the input-coupler(s) 112. For example, a red portion of the scanned image is coupled into the waveguide 100R, a green portion of the scanned image is coupled into the waveguide 100G, and a blue portion of the scanned image is coupled into the waveguide 100B.

In accordance with certain embodiments, a surface area of the biaxial image reprojecting MEMS mirror 422 is larger than a surface area of the biaxial image producing MEMS mirror 420, so that the biaxial image reprojecting MEMS mirror 422 can accommodate the diverging beam (of the pupil corresponding to the scanned image) that is projected onto the biaxial image reprojecting MEMS mirror 422 by the biaxial image producing MEMS mirror 420. More specifically, a diameter of the biaxial image reprojecting MEMS mirror 422 is larger than a diameter of the biaxial image producing MEMS mirror 420. Further, in accordance with certain embodiments, a size (e.g., diameter or area) of the reprojected pupil at the input-coupler(s) 112 is smaller than a size of the pupil corresponding to the scanned image that is projected onto the biaxial image reprojecting MEMS mirror 422. This way a diameter of the input-coupler(s) 112 can be made to be no larger than 5 mm in diameter, and more preferably within the range from 2 mm to 4 mm in diameter, and even more preferably within the range from about 3 mm to 3.5 mm in diameter. More generally, because the size of the reprojected pupil at the input-coupler(s) 112 is smaller than the size of the pupil corresponding to the scanned image that is projected onto the image reprojecting MEMS mirror 422, the input-coupler(s) 112 can be made smaller than would be possible if the pupil projected by the image producing MEMS mirror 420 were projected directly onto the input-coupler(s) 112. It is noted that the term "diameter," as used herein, does not necessary imply that the shape of the element (e.g., input-coupler) being referred to is circular. Rather, the term "diameter" is being used to refer to the distance between opposing sides of an element whose shape can be a circular, square, rectangular, or the like.

In accordance with certain embodiments, the biaxial image producing MEMS mirror 420 and the biaxial image reprojecting MEMS mirror 422 are each implemented as a respective a monolithic reflective mirror, which is also known as a micro-scanning mirror. Monolithic reflective micro-scanning mirrors are available, e.g., from MicroVision, Inc., which is headquartered in Redmond, Wash. In accordance with other embodiments, the biaxial image producing MEMS mirror 420 and the biaxial image reprojecting MEMS mirror 422 are each a segmented (pixelated) reflector, which may include thousands of microscopically small mirrors laid out in a matrix on a semiconductor chip, known as a Digital Micromirror Device (DMD), that uses Digital Light Processing (DLP) technology that was originally developed by Texas Instruments, Inc., headquartered in Dallas, Tex. It is also possible that one of the biaxial image producing MEMS mirror 420 and the biaxial image reprojecting MEMS mirror 422 is implemented as a monolithic reflective mirror, while the other is implemented as a segmented (pixelated) reflector.

The biaxial image producing MEMS mirror 420 and the biaxial image reprojecting MEMS mirror 422 can be synchronously but separately controlled using any one of various types of actuation, such as, but not limited to, magnetic actuation, electromagnetic actuation, electrostatic actuation discussed, piezoelectric actuation, or thermal bimorph actuation. When used to perform raster-scanning, the biaxial image producing MEMS mirror 420 may have a fast axis that oscillates at resonance and a slow axis that performs a non-resonant scan with a saw-tooth characteristic. More specifically, the biaxial image producing MEMS mirror 420 can be controlled using a sinusoidal shaped fast axis control signal (also known as a horizontal control signal, or an H control signal) and a saw-tooth shaped slow axis control signal (also known as a vertical control signal, or a V control signal). Further, the biaxial image reprojecting MEMS mirror 422 can be controlled using a separate sinusoidal shaped fast axis control signal and a separate saw-tooth shaped slow axis control signal.

In accordance with certain embodiments, the fast axis control signal that is used to control the image reprojecting MEMS mirror 422 has a same frequency and shape as the fast axis control signal that is used to control the biaxial image producing MEMS mirror 420, but is offset in phase relative to the fast axis control signal that is used to control the biaxial image producing MEMS mirror 420. More specifically, there can be a 180 degree phase offset between the fast axis control signal that is used to control the image reprojecting MEMS mirror 422 and the fast axis control signal that is used to control the biaxial image producing MEMS mirror 420.

In accordance with certain embodiments, the slow axis control signal that is used to control the image reprojecting MEMS mirror 422 has a same frequency and shape as the slow axis control signal that is used to control the biaxial image producing MEMS mirror 420, but is offset in phase relative to the slow axis control signal that is used to control the biaxial image producing MEMS mirror 420. More specifically, there can be a 180 degree phase offset between the slow axis control signal that is used to control the image reprojecting MEMS mirror 422 and the slow axis control signal that is used to control the biaxial image producing MEMS mirror 420.

Still referring to FIG. 4A, the biaxial image producing MEMS mirror 420 and the biaxial image reprojecting MEMS mirror 422 are shown as being positioned relative to one another, and relative to the optical waveguide(s) 100, such that the single beam of light 418 produced by the optical subsystem 416 travels in free-space from the optical subsystem 416 to the biaxial image producing MEMS mirror 420 in a direction that is substantially parallel to the major planar surfaces 108 and 110 of the optical waveguide(s) 100. This is believed to provide for a very compact implementation of the display engine 404a, and is believed to enable the display engine 404a to be located substantially as close as possible to the optical waveguide(s) 100. In a similar manner, the biaxial image producing MEMS mirror 420 could be positioned off an edge of the waveguide(s) 100, and the biaxial image reprojecting MEMS mirror 422 would be positioned over the input pupil of the waveguide(s) 100 making the optical system even more compact.

Figure 4B:
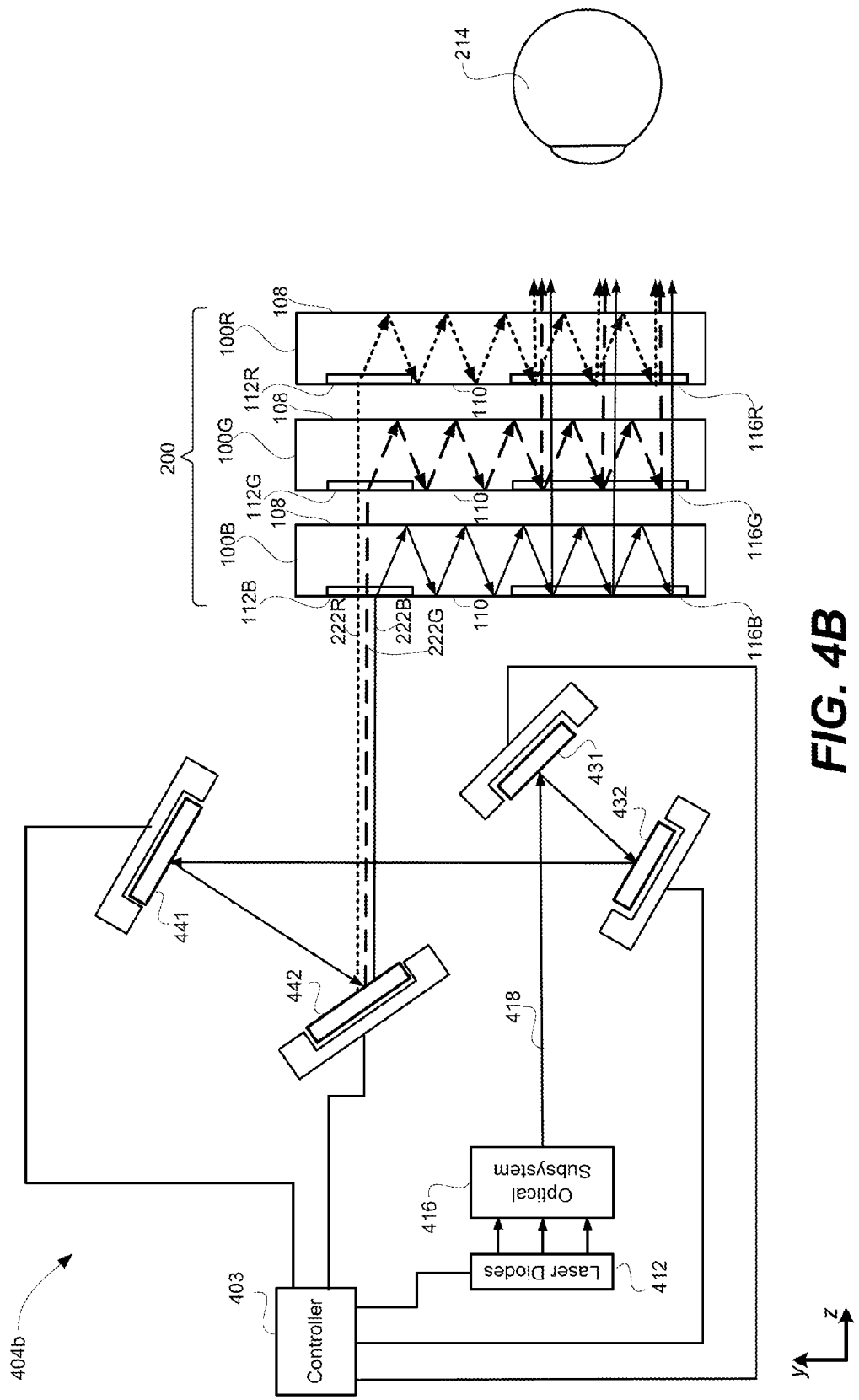
FIG. 4B illustrates a display engine, according to an embodiment of the present technology, that includes a two uniaxial image producing MEMS mirrors and two uniaxial image reprojecting MEMS mirrors.
Figure 4C:
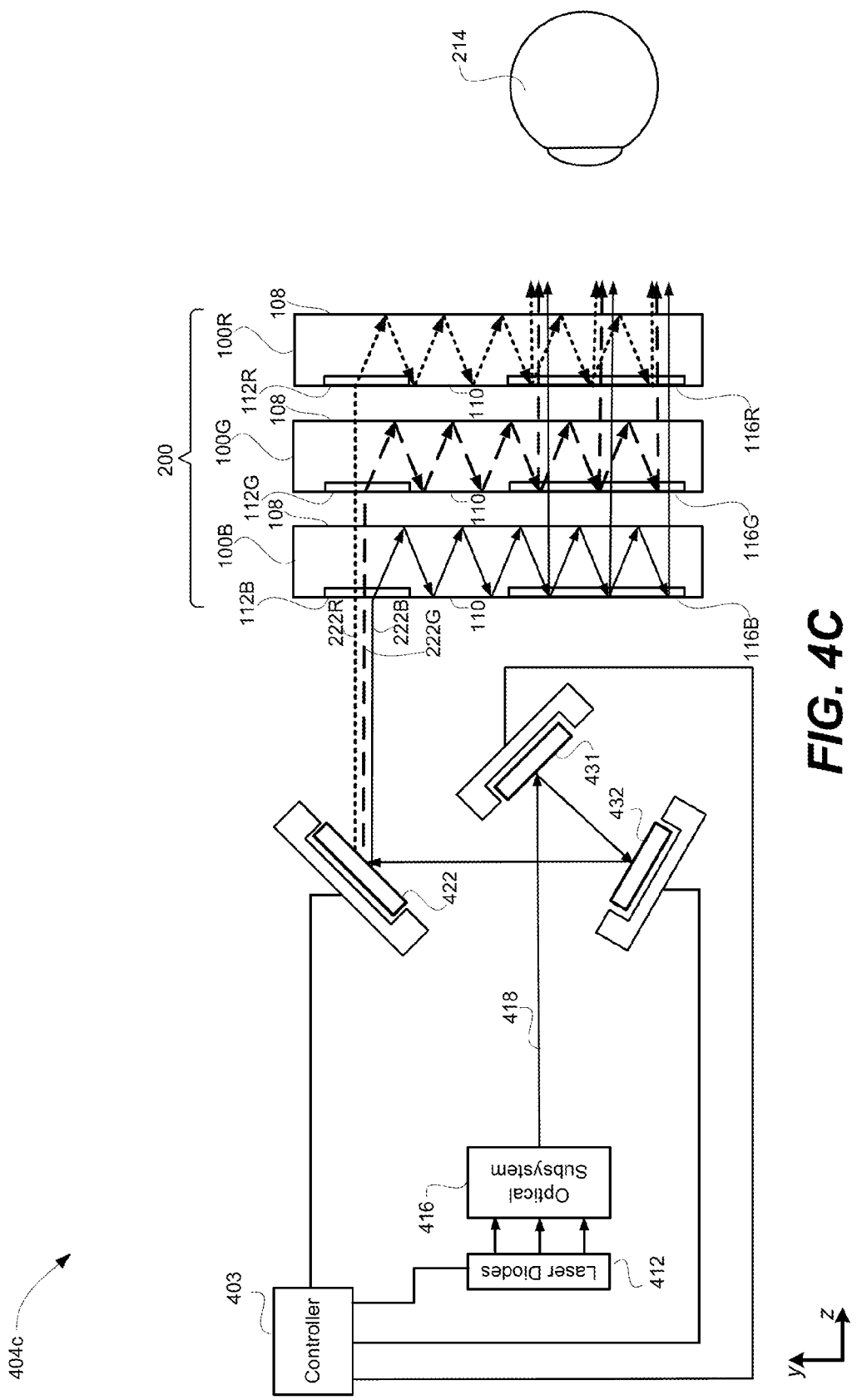
FIG. 4C illustrates a display engine, according to an embodiment of the present technology, that includes a two uniaxial image producing MEMS mirrors and one biaxial image reprojecting MEMS mirror.
Figure 4D:
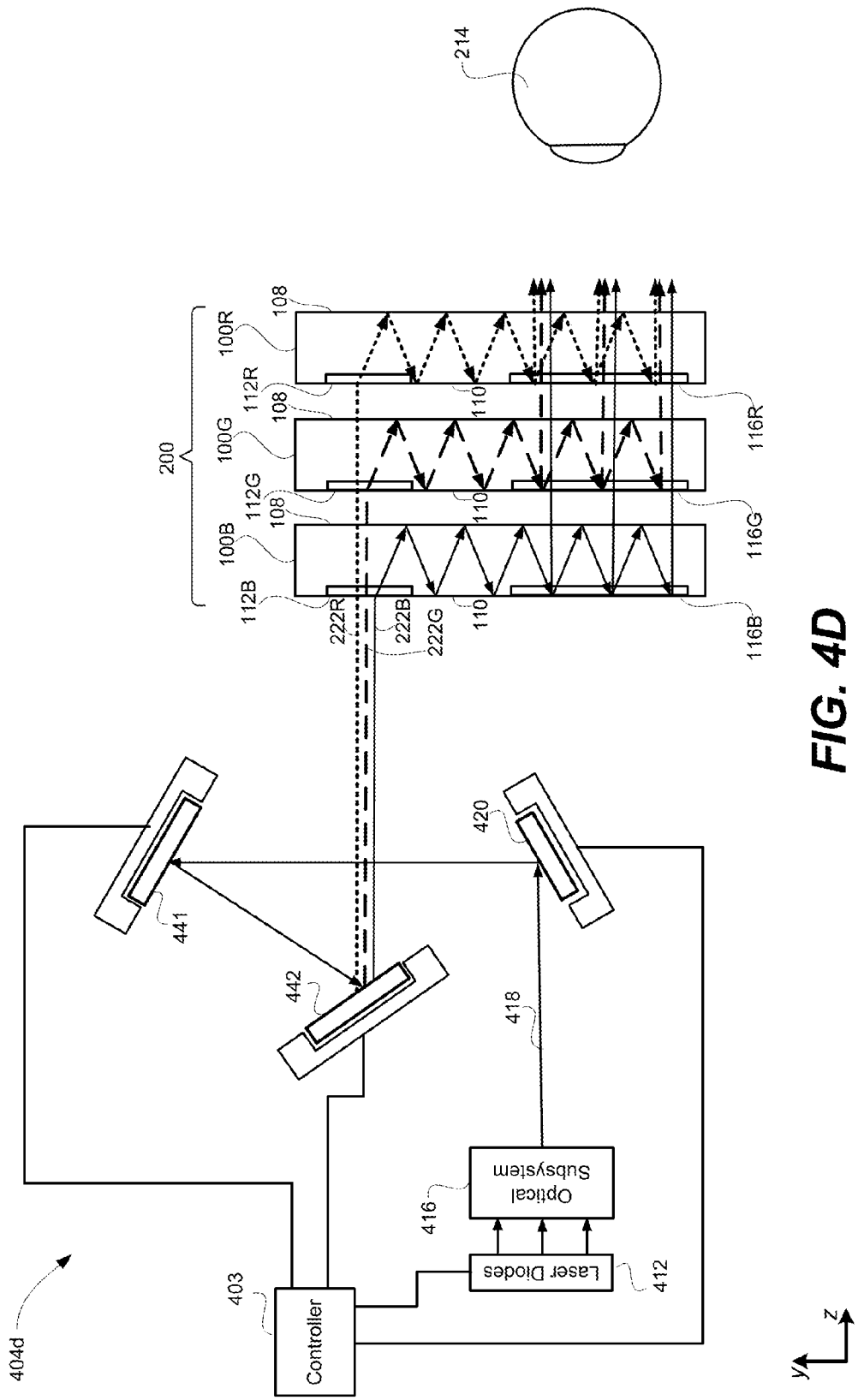
FIG. 4D illustrates a display engine, according to an embodiment of the present technology, that includes one biaxial image producing MEMS mirror and two uniaxial image reprojecting MEMS mirrors.

Referring now to FIG. 4B, an alternative display engine 404b is shown as including uniaxial image producing MEMS mirrors 431 and 432, and uniaxial image reprojecting MEMS mirrors 441 and 442. The display engine 404b is also shown as including a controller 403, a plurality of LDs 412, and an optical subsystem 416, which elements are similar to those described above using the same reference numbers in the discussion of FIG. 4A, and thus, need not be described again in the same amount of detail.

Still referring to FIG. 4B, the uniaxial image producing MEMS mirrors 431 is positioned to reflect the single beam of light 418 (that is produced by the optical subsystem 416) towards the uniaxial image producing MEMS mirror 432. The uniaxial image producing MEMS mirrors 431 and 432 are collectively used to produce a pupil corresponding to a scanned image that is projected onto the uniaxial image reprojecting MEMS mirror 441. The uniaxial image reprojecting MEMS mirror 441 reflects the pupil corresponding to the scanned image toward the uniaxial image reprojecting MEMS mirror 442, which reflects the pupil corresponding to the scanned image toward the input-coupler(s) 112 of the waveguide(s) 100. In other words, the uniaxial image reprojecting MEMS mirrors 441 and 442 collectively reproject the pupil corresponding to the scanned image (produced by the uniaxial image producing MEMS mirrors 431 and 432) onto the input-coupler(s) 112 of the optical waveguide(s) 100, and thereby cause the pupil corresponding to the scanned image to be coupled into the optical waveguide(s) 100 by the input-coupler(s) 112. For example, a red portion of the pupil corresponding to the scanned image is coupled into the waveguide 100R, a green portion of the pupil corresponding to the scanned image is coupled into the waveguide 100G, and a blue portion of the pupil corresponding to the scanned image is coupled into the waveguide 100B.

One of the uniaxial image producing MEMS mirrors 431 and 432 can be controlled using a sinusoidal shaped fast axis control signal (also known as a horizontal control signal, or an H control signal), and the other one can be controlled by a saw-tooth shaped slow axis control signal (also known as a vertical control signal, or a V control signal), both of which controls signals can be produced by the controller 403. Similarly, one of the uniaxial image reprojecting MEMS mirrors 441 and 442 can be controlled using a sinusoidal shaped fast axis control signal, and the other one can be controlled by a saw-tooth shaped slow axis control signal, both of which controls signals can be produced by the controller 403.

In accordance with certain embodiments, the fast axis control signal that is used to control one of the uniaxial image reprojecting MEMS mirrors 441 or 442 has a same frequency and shape as the fast axis control signal that is used to control one of the uniaxial image producing MEMS mirrors 431 or 432, but is offset in phase. More specifically, there can be a 180 degree phase offset between the fast axis control signal that is used to control one of the uniaxial image reprojecting MEMS mirrors 441 or 442 and the fast axis control signal that is used to control one of the uniaxial image producing MEMS mirrors 431 or 432.

In accordance with certain embodiments, the slow axis control signal that is used to control the other one of the uniaxial image reprojecting MEMS mirrors 441 or 442 has a same frequency and shape as the slow axis control signal that is used to control the other one of the uniaxial image producing MEMS mirrors 431 or 432, but is offset in phase. More specifically, there can be a 180 degree phase offset between the slow axis control signal that is used to control one of the uniaxial image reprojecting MEMS mirrors 441 or 442 and the slow axis control signal that is used to control one of the uniaxial image producing MEMS mirrors 431 or 432.

In accordance with certain embodiments, a surface area of each of the uniaxial image reprojecting MEMS mirrors 441 and 442 is larger than a surface area of each of the uniaxial image producing MEMS mirrors 431 and 432, so that the uniaxial image reprojecting MEMS mirrors 441 and 442 can accommodate the diverging beam (of the pupil corresponding to the scanned image) that is projected onto the uniaxial image reprojecting MEMS mirrors 441 and 442 by the uniaxial image producing MEMS mirrors 431 and 432. Further, in accordance with certain embodiments, a size (e.g., diameter or area) of the reprojected pupil corresponding to the scanned image at the input-coupler(s) 112 is smaller than a size of the pupil corresponding to the scanned image that is projected onto the uniaxial image reprojecting MEMS mirror 441. This way the input-coupler(s) 112 can be made to be no larger than 5 mm in diameter, and more preferably within the range from 2 mm to 4 mm in diameter, and even more preferably within the range from about 3 mm to 3.5 mm in diameter. More generally, because the size of the reprojected pupil corresponding to the scanned image at the input-coupler(s) 112 is smaller than the size of the pupil corresponding to the scanned image that is projected onto the image reprojecting MEMS mirror 441, the input-coupler(s) 112 can be made smaller than would be possible if the pupil corresponding to the scanned image projected by the uniaxial image producing MEMS mirrors 431 and 432 were projected directly onto the input-coupler(s) 112.

In accordance with certain embodiments, the uniaxial image producing MEMS mirrors 431 and 432 and the uniaxial image reprojecting MEMS mirrors 441 and 442 are each implemented as a respective a monolithic reflective mirror, which is also known as a micro-scanning mirror. In accordance with other embodiments, the uniaxial image producing MEMS mirrors 431 and 432 and the uniaxial image reprojecting MEMS mirrors 441 and 442 are each implemented using a segmented (pixelated) reflector, which may include thousands of microscopically small mirrors laid out in a matrix on a semiconductor chip. It is also possible that one or more of the uniaxial MEMS mirrors 431, 432, 441 and 442 is/are implemented as a respective a monolithic reflective mirror, while other one(s) of the uniaxial MEMS mirrors 431, 432, 441 and 442 is/are implemented using a segmented (pixelated) reflector, exemplary details of which were described above with reference to FIG. 4A.

In the display engine 404a in FIG. 4A, described above, a pupil corresponding to a scanned image is initially produced and projected using a biaxial image producing MEMS mirror 420, and that pupil is reprojected onto the input-coupler(s) 112 of the waveguide(s) 100 using a biaxial image reprojecting MEMS mirror 422. In the display engine 404b in FIG. 4B, described above, a pupil corresponding to a scanned image is initially produced and projected using two uniaxial image producing MEMS mirrors 431 and 432, and that pupil is reprojected onto the input-coupler(s) 112 of the waveguide(s) 100 using two uniaxial image reprojecting MEMS mirrors 441 and 442. In alternative embodiments a combination of uniaxial and biaxial MEMS mirrors can be used. For example, in a display engine 404c shown in FIG. 4C, a pupil corresponding to a scanned image is initially produced and projected using two uniaxial image producing MEMS mirrors 431 and 432, and that pupil is reprojected onto the input-coupler(s) 112 of the waveguide(s) 100 using the biaxial image reprojecting MEM mirrors 422. For another example, in a display engine 404d shown in FIG. 4D, a pupil corresponding to a scanned image is initially produced and projected using a biaxial image producing MEMS mirror 420, and that pupil is reprojected onto the input-coupler(s) 112 of the waveguide(s) 100 using two uniaxial image reprojecting MEMS mirrors 441 and 442.

Other variations are possible, and are within the scope of the present technology, as would be appreciated by one of ordinary skill in the art after they have read this disclosure.

In FIGS. 4A-4D, the dotted arrowed line 222R is representative of red (R) light of a pupil corresponding to an image that is output by the display engine 204, the dashed arrowed line 222G is representative of green (G) light of the pupil corresponding to the image that is output by the display engine 204, and the solid arrowed line 222B is representative of blue (B) light of the pupil corresponding to the image that is output by the display engine 204. While the R, G and B light (222R, 222G and 22B) is shown as being spatially offset from one another, this is likely not the case, but rather, FIGS. 4A-4D were drawn in this manner so that the R, G and B light can be separately represented. More likely, the R, G and B light (222R, 222G and 22B) that exits the display engine 204 would completely overlap one another.

In FIGS. 4A-4D, three waveguides 100R, 100G and 100B were shown as being used to transfer R, G and B light corresponding to an image from a respective input-coupler 112R, 112G and 112B to a respective output-coupler 116R, 116G and 116B by way of TIR. In other embodiments, a single waveguide can be used to transfer light of more than one color. It is also possible that the image that is produced by a display engine is a monochromatic image, in which case there may be only single laser diode 412 and only a single waveguide 100.

In accordance with certain embodiments, all of the components of a display engine (e.g., 404a, 404b, 404c or 404d) can be sealed within a hermetic vacuum encapsulation package, which enables the MEMS mirrors to be actuated more quickly and accurately than would be possible if they were not located within a vacuum. In other embodiments, just the MEMS mirrors and the components that actuate the MEMS mirrors are sealed within a hermetic vacuum encapsulation package. Such a package can include optical windows for allowing light to enter and exit the package. Other variations are also possible. For example, the optical subsystem 416, and potentially the laser diodes 412, can also be sealed within a hermetic vacuum encapsulation package along with the MEMS mirrors. In accordance with certain embodiments, dimensions of the hermetic vacuum encapsulation package that includes the MEMS mirrors (and potentially the optical subsystem 416 and the laser diodes 412) is no larger than 25 mm×12 mm×12 mm, and is no heavier than about 25 grams.

While the display engines 404a, 404b, 404c and 404d were described as including one or more laser diodes, e.g., R, G and B laser diodes, it is possible that alternative types of light emitting elements may be used in place of laser diodes, such as, but not limited to, one or more light emitting diode (LEDs), super luminescent light emitting diodes (SLEDs), or a quantum dot light emitting diodes (QD-LED), but not limited thereto. In accordance with an embodiment, a red wavelength range produced by a red light emitting element is from 600 nm to 650 nm, a green wavelength range produced by a green light emitting element is from 500 nm to 550 nm, and a blue wavelength range produced by a blue light emitting element is from 430 nm to 480 nm, as noted above. Narrower or wider wavelength ranges are also possible.

Figure 5:
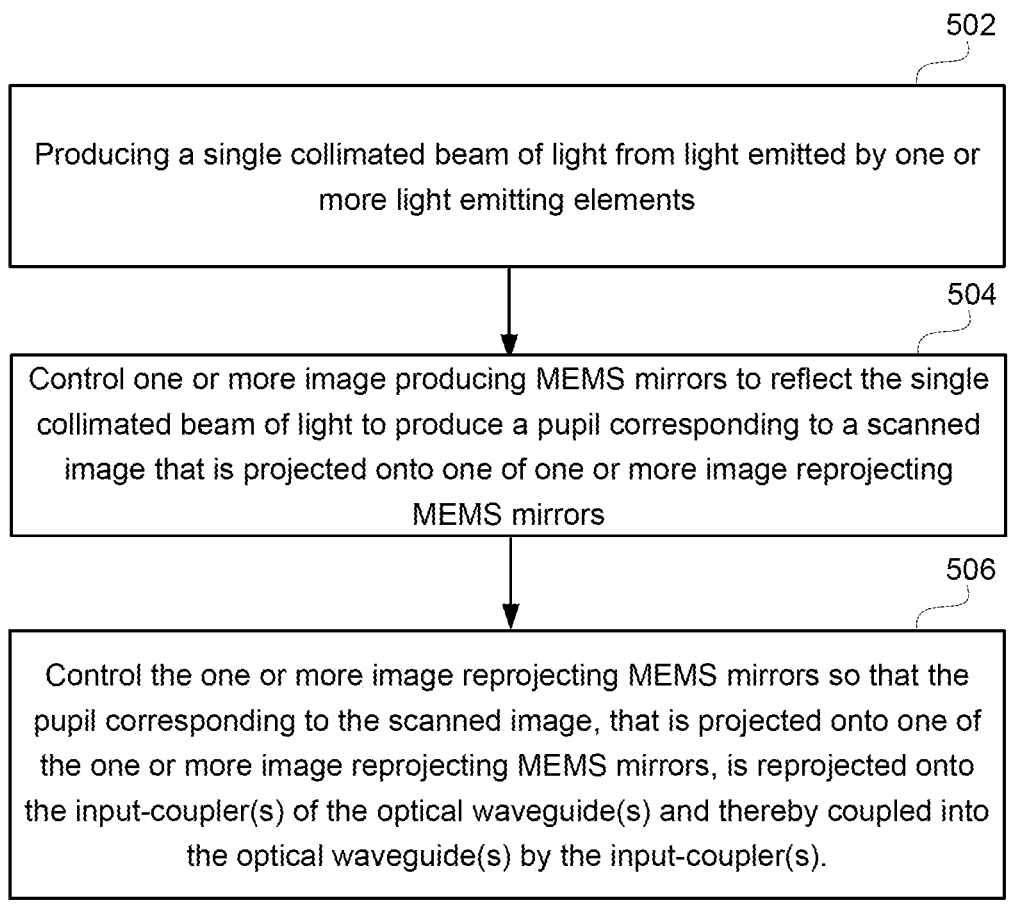
FIG. 5 is a high level flow diagram that is used to summarize methods according to certain embodiments of the present technology.

FIG. 5 is a high level flow diagram that is used to summarize methods according to various embodiments of the present technology. Such methods can be for use with a near eye or heads up display system that includes one or more optical waveguides each including an input-coupler and an output-coupler. Each of the optical waveguide(s) is configured to cause light that is coupled into the optical waveguide by the input-coupler thereof to travel by way of TIR to the output-coupler thereof where the light is coupled out of the waveguide.

Referring to FIG. 5, step 502 involves producing a single collimated beam of light from light emitted by one or more light emitting elements. Step 502 can be performed, e.g., by the optical subsystem 416 shown in and described with reference to FIGS. 4A-4D. Such an optical subsystem 416 can include, e.g., a beam combiner and one or more collimating lenses. The beam combiner can include, e.g., dichroic filters, and/or other beam combiner optics, to combine the red, green and blue light beams or light beams of other colors.

Still referring to FIG. 5, step 504 involves controlling one or more image producing MEMS mirrors to reflect the single collimated beam of light to produce a pupil corresponding to a scanned image that is projected onto one of one or more image reprojecting MEMS mirrors. Step 506 involves controlling the one or more image reprojecting MEMS mirrors so that the pupil corresponding to the scanned image, that is projected onto one of the one or more image reprojecting MEMS mirrors, is reprojected onto the input-coupler(s) of the optical waveguide(s) and thereby coupled into the optical waveguide(s) by the input-coupler(s). For example, referring back to FIGS. 4A-4D, at step 506 red light 222R of a pupil corresponding to the image can be coupled into the optical waveguide 100R by the input-coupler 112R, green light 222G of the pupil corresponding to the image can be coupled into the optical waveguide 100G by the input-coupler 112G, and blue light 222B of the pupil corresponding to the image can be coupled into the optical waveguide 100B by the input-coupler 112B.

Still referring back to FIGS. 4A-4D, the methods of FIG. 5 enables a size of the reprojected pupil corresponding to the scanned image at the input-coupler(s) 112 to be smaller than a size of the pupil corresponding to the scanned image that is projected onto the image reprojecting MEMS mirror 422 (in FIGS. 4A and 4C) or 441 (in FIGS. 4B and 4D). Beneficially, because the size of the reprojected pupil at the input-coupler(s) 112 is smaller than the size of the pupil that is projected onto the image reprojecting M EMS mirror 422 or 441, the input-coupler(s) 112 can be made smaller than would be possible if the pupil corresponding to the scanned image projected by the image producing MEMS mirrors 420 (in FIGS. 4A and 4D) or 432 (in FIGS. 4B and 4C), were projected directly onto the input-coupler(s) 112.

Referring again to FIG. 5, the controlling the one or more image producing MEMS mirrors and the controlling the one or more image reprojecting MEMS mirrors at steps 504 and 506 are synchronously performed in accordance with certain embodiments. More specifically, step 504 can be performed using a first fast axis control signal and a first slow axis control signal that are respectively used to resonate fast and slow axes associated with the one or more image producing MEMS mirrors, and step 506 can be performed using a second fast axis control signal and a second slow axis control signal that are respectively used to resonate fast and slow axes associated with the one or more image reprojecting MEMS mirrors. In accordance with certain embodiments, the second fast axis control signal has a same frequency and a same shape as the first fast axis control signal but is offset in phase by 180 degrees relative to the first fast axis control signal, and the second slow axis control signal has a same frequency and a same shape as the first slow axis control signal but is offset in phase by 180 degrees relative to the first slow axis control signal.

As can be appreciated from the discussion of FIGS. 4A-4D, the one or more image producing MEMS mirrors that are controlled at step 504 can be either one biaxial MEMS mirror, or a pair of uniaxial MEMS mirrors; and the one or more image reprojecting MEMS mirrors that are controlled at step 506 can be either one biaxial MEMS mirror, or a pair of uniaxial MEMS mirrors. Further details of such methods can be appreciated from the above discussion of FIGS. 1A-1C, 2, 3 and 4A-4D.

In the above description and the FIGS. described therein, the waveguides 100 were typically described and shown as being planar waveguides that each include a pair of planar opposing main surfaces. In an alternative embodiment, one or both of the main surfaces of a waveguide could be non-planar, e.g., curved. In the above description and the FIGS. described therein, the waveguides 100 were typically described and shown as being parallel to one another, however that need not be the case.

It is noted that one or more static mirrors may be included within the display engines 204, 404a, 404b, 404c and 404d to redirect light as desired between an optical subsystem (e.g., 316 or 416) and a MEMS mirror, or between a pair of MEMS mirrors, or between a MEMS mirror and an input-coupler. For example, where the biaxial image producing MEMS mirror 420 is positioned to reflect the single beam of light 418 produced by the optical subsystem 416, it is possible that the single beam of light 418 is reflected and thereby redirected by a static mirror before the single beam of light 418 is incident on and reflected by the biaxial image producing MEMS mirror 420.

In the above description, the display engines 204, 404a, 404b, 404c and 404d were described as outputting red, green and blue light of a pupil corresponding to an image, and the waveguides 100 were described as transferring the red, green and blue light from the input-couplers 112 to the output-couplers 116 of the various waveguides 100, and more generally, from an input-pupil to an output-pupil. However, it is also within the scope of the present technology that the light output by the display engines include alternative colors, such as, but not limited to, cyan, magenta and yellow, in which cases the input-couplers 112 and output-couplers 116 (and intermediate-components 114, if present) would be designed for such alternative wavelength ranges. It is also within the scope of the present technology that more than three colors of light be output by a display engine, e.g., a display engine can output red, green, blue and yellow light of a pupil corresponding to an image. In this latter case, an additional waveguide can be used to guide the yellow light, or the yellow light can be guided within one of the waveguides that also guides one of the other colors. Other variations are possible and within the scope of the present technology.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A display engine for use with one or more optical waveguides each including an input-coupler and an output-coupler, each of the optical waveguide(s) configured to cause light that is coupled into the optical waveguide by the input-coupler thereof, to travel by way of total internal reflection (TI R) to the output-coupler thereof where the light is coupled out of the waveguide, the display engine comprising:
    one or more light emitting elements each of which is configured to emit light in response to being driven;
    an optical subsystem configured to produce a single collimated beam of light from the light emitted by the one or more light emitting elements;
    one or more image producing MEMS mirrors at least one of which is positioned to reflect the single collimated beam of light produced by the optical subsystem;
    one or more image reprojecting MEMS mirrors; and
    a controller configured to control the one or more image producing MEMS mirrors and the one or more image reprojecting MEMS mirrors;
    wherein the one or more image reprojecting MEMS mirrors is/are controlled and is/are positioned relative to the one or more image producing MEMS mirrors and relative to the input-coupler(s) of the optical waveguide(s) so that a pupil corresponding to a scanned image that the one or more image producing MEMS mirrors project onto one of the one or more image reprojecting MEMS mirrors, is reprojected by the one or more image reprojecting MEMS mirrors onto the input-coupler(s) of the optical waveguide(s) and thereby coupled into the optical waveguide(s) by the input-coupler(s).

2. The display engine of claim 1, wherein a size of the reprojected pupil at the input-coupler(s) is smaller than a size of the pupil that is projected onto one of the one or more image reprojecting MEMS mirrors by the one or more image producing MEMS mirrors.

3. The display engine of claim 2, wherein because the size of the reprojected pupil at the input-coupler(s) is smaller than the size of the pupil that is projected onto one of the one or more image reprojecting MEMS mirrors, the input-coupler(s) can be made smaller than would be possible if the pupil corresponding to the scanned image projected by the one or more image producing MEMS mirrors were projected directly onto the input-coupler(s).

4. The display engine of claim 1, wherein the controller is configured to produce:
    a first fast axis control signal a first slow axis control signal that are respectively used to resonate fast and slow axes associated with the one or more image producing MEMS mirrors; and
    a second fast axis control signal a second slow axis control signal that are respectively used to resonate fast and slow axes associated with the one or more image reprojecting MEMS mirrors;
    wherein the second fast axis control signal has a same frequency and a same shape as the first fast axis control signal but is offset in phase relative to the first fast axis control signal; and
    wherein the second slow axis control signal has a same frequency and a same shape as the first slow axis control signal but is offset in phase relative to the first slow axis control signal.

5. The display engine of claim 4, wherein:
    the second fast axis control signal is offset in phase by 180 degrees relative to the first fast axis control signal; and
    the second slow axis control signal is offset in phase by 180 degrees relative to the first slow axis control signal.

6. The display engine of claim 1, wherein:
    the optical waveguide includes first and second major planar surfaces that are substantially parallel to one another; and the optical subsystem and one of the one or more image producing MEMS mirrors are positioned relative to one another and relative to the optical waveguide such that the single beam of collimated light produced by the optical subsystem travels in free-space from the optical subsystem to the one of the one or more image producing MEMS mirrors in a direction that is substantially parallel to the first and second major planar surfaces of the optical waveguide.

7. The display engine of claim 1, wherein:
the one or more image producing MEMS mirrors consist of a first biaxial MEMS mirror; and
the one or more image reprojecting MEMS mirrors consist of a second biaxial MEMS mirror.

8. The display engine of claim 1, wherein:
the one or more image producing MEMS mirrors include first and second uniaxial MEMS mirrors; and
the one or more image reprojecting MEMS mirrors include third and fourth uniaxial MEMS mirrors.

9. The display engine of claim 1, wherein:
the one or more image producing MEMS mirrors consist of either one biaxial MEMS mirror, or a pair of uniaxial MEMS mirrors; and
the one or more image reprojecting MEMS mirrors consist of either one biaxial MEMS mirror, or a pair of uniaxial MEMS mirrors.

10. The display engine of claim 1, wherein the controller is configured to synchronously control the one or more image producing MEMS mirrors and the one or more image reprojecting MEMS mirrors.

11. A method for use with one or more optical waveguides each including an input-coupler and an output-coupler, each of the optical waveguide(s) configured to cause light that is coupled into the optical waveguide by the input-coupler thereof to travel by way of total internal reflection (TIR) to the output-coupler thereof where the light is coupled out of the waveguide, the method comprising:
producing a single collimated beam of light from light emitted by one or more light emitting elements; and
controlling one or more image producing MEMS mirrors to reflect the single collimated beam of light to produce a pupil corresponding to a scanned image that is projected onto one of one or more image reprojecting MEMS mirrors; and
controlling the one or more image reprojecting MEMS mirrors so that the pupil corresponding to the scanned image, that is projected onto one of the one or more image reprojecting MEMS mirrors, is reprojected onto the input-coupler(s) of the optical waveguide(s) and thereby coupled into the optical waveguide(s) by the input-coupler(s).

12. The method of claim 11, wherein:
a size of the reprojected pupil at the input-coupler(s) is smaller than a size of the pupil that is projected onto one of the one or more image reprojecting MEMS mirrors; and
because the size of the reprojected pupil at the input-coupler(s) is smaller than the size of the pupil that is projected one of the one or more image reprojecting MEMS mirrors, the input-coupler(s) can be made smaller than would be possible if the pupil corresponding to the scanned image projected by the one or more image producing MEMS mirrors were projected directly onto the input-coupler(s).

13. The method of claim 11, wherein:
the controlling the one or more image producing MEMS mirrors and the controlling the one or more image reprojecting MEMS mirrors are synchronously performed;
the controlling the one or more image producing MEMS mirrors is performed using a first fast axis control signal and a first slow axis control signal that are respectively used to resonate fast and slow axes associated with the one or more image producing MEMS mirrors; and
the controlling the one or more image reprojecting MEMS mirrors is performed using a second fast axis control signal and a second slow axis control signal that are respectively used to resonate fast and slow axes associated with the one or more image reprojecting MEMS mirrors.

14. The method of claim 13, wherein:
wherein the second fast axis control signal has a same frequency and a same shape as the first fast axis control signal but is offset in phase by 180 degrees relative to the first fast axis control signal; and
wherein the second slow axis control signal has a same frequency and a same shape as the first slow axis control signal but is offset in phase by 180 degrees relative to the first slow axis control signal.

15. The method of claim 11, wherein:
the one or more image producing MEMS mirrors consist of either one biaxial MEMS mirror, or a pair of uniaxial MEMS mirrors; and
the one or more image reprojecting MEMS mirrors consist of either one biaxial MEMS mirror, or a pair of uniaxial MEMS mirrors.

16. A display system, comprising:
a plurality of optical waveguides each including an input-coupler and an output-coupler, each of the optical waveguides configured to cause light that is coupled into the optical waveguide by the input-coupler thereof, to travel by way of total internal reflection (TIR) to the output-coupler thereof where the light is coupled out of the waveguide;
a plurality of light emitting elements each of which is configured to emit light of a different color than the other light emitting elements in response to being driven;
an optical subsystem configured to produce a single collimated beam of light from the light emitted by the plurality of light emitting elements;
a biaxial image producing MEMS mirror positioned to reflect the single collimated beam of light produced by the optical subsystem; and
a biaxial image reprojecting MEMS mirror positioned relative to the biaxial image producing MEMS mirror and the input-couplers of the optical waveguides so that a pupil corresponding to a scanned image that is reflected off of the biaxial image producing MEMS mirror can be reprojected by the biaxial image reprojecting MEMS mirror onto the input-couplers of the optical waveguides.

17. The system of claim 16, further comprising a controller that is configured to synchronously control the biaxial image producing MEMS mirror and the biaxial image reprojecting MEMS mirror.

18. The system of claim 17, wherein the controller is configured to:
produce a first fast axis control signal and a first slow axis control signal that are respectively used to resonate fast and slow axes associated with the biaxial image producing MEMS mirror to produce the pupil corresponding to the scanned image that is projected onto the biaxial image reprojecting MEMS mirror; and produce a second fast axis control signal and a second slow axis control signal that are respectively used to resonate fast and slow axes associated with the biaxial image reprojecting MEMS mirror so that the pupil corresponding to the scanned image, that is projected onto the biaxial image reprojecting MEMS mirror, is reprojected onto the input-couplers of the optical waveguides and thereby coupled into the optical waveguides by the input-couplers.

19. The system of claim 18, wherein:

the second fast axis control signal is offset in phase by 180 degrees relative to the first fast axis control signal; and the second slow axis control signal is offset in phase by 180 degrees relative to the first slow axis control signal.

20. The system of claim 18, wherein:

a size of the reprojected pupil at the input-couplers is smaller than a size of the pupil that is projected onto the predetermined projection area at which is located the biaxial image reprojecting MEMS mirror.

* * * * *